United States Patent
Bonnet

(10) Patent No.: US 12,084,744 B2
(45) Date of Patent: Sep. 10, 2024

(54) PROCESS FOR RECOVERING PRECIOUS METALS FROM MOLECULAR SIEVE BODIES

(71) Applicant: Fred W. Bonnet, Redding, CT (US)

(72) Inventor: Fred W. Bonnet, Redding, CT (US)

(*) Notice: Subject to any disclaimer, the term of this patent is extended or adjusted under 35 U.S.C. 154(b) by 0 days.

(21) Appl. No.: 17/983,198

(22) Filed: Nov. 8, 2022

(65) Prior Publication Data

US 2023/0141211 A1 May 11, 2023

Related U.S. Application Data

(60) Provisional application No. 63/276,789, filed on Nov. 8, 2021.

(51) Int. Cl.
| | |
|---|---|
| *C22B 3/16* | (2006.01) |
| *B01J 39/04* | (2017.01) |
| *B01J 39/20* | (2006.01) |
| *C22B 11/00* | (2006.01) |

(52) U.S. Cl.
CPC .............. *C22B 3/1625* (2013.01); *B01J 39/04* (2013.01); *B01J 39/20* (2013.01); *C22B 11/048* (2013.01)

(58) Field of Classification Search
CPC ..................................................... C22B 11/048
See application file for complete search history.

(56) References Cited

U.S. PATENT DOCUMENTS

| | | | | |
|---|---|---|---|---|
| 3,999,983 | A | * 12/1976 | Grosbois | C01G 55/001 423/22 |
| 4,223,173 | A | * 9/1980 | Manziek | C07C 5/03 585/254 |
| 4,311,812 | A | 1/1982 | Manziek | |
| 4,440,871 | A | 4/1984 | Lok et al. | |
| 4,499,315 | A | 2/1985 | Garska et al. | |
| 4,741,820 | A | 5/1988 | Coughlin et al. | |
| 4,899,016 | A | 2/1990 | Clark et al. | |

FOREIGN PATENT DOCUMENTS

CN  101376923 A  * 3/2009

OTHER PUBLICATIONS

Daintith, John. (2008). Dictionary of Chemistry (6th Edition)—mineral. (p. 358). Oxford University Press. (Year: 2008).*
Espacenet English machine translation of CN101376923A retrieved on May 26, 2023 (Year: 2009).*
Don W. Green, and Robert H. Perry. Perry's Chemical Engineers' Handbook, Eighth Edition. McGraw-Hill Education, 2008. (Year: 2008).*
S. H. Park, W. Choi, H. J. Choi, S. B. Hong, Organic-Free Synthesis of Silicoaluminophosphate Molecular Sieves. Angew. Chem. Int. Ed. 2018, 57, 9413 (Year: 2018).*

* cited by examiner

*Primary Examiner* — Jophy S. Koshy
*Assistant Examiner* — Joshua S Carpenter
(74) *Attorney, Agent, or Firm* — FORGE IP, PLLC

(57) ABSTRACT

Precious metals such as those of the platinum group can be effectively recovered from crystalline aluminosilicate supports, for example from spent catalysts, without appreciable degradation of the crystal structure by ion-exchange using a base metal ion containing medium and subsequent sequestration of the precious metal in elemental form on a nonionic cross linked borane reducing resin.

14 Claims, 1 Drawing Sheet

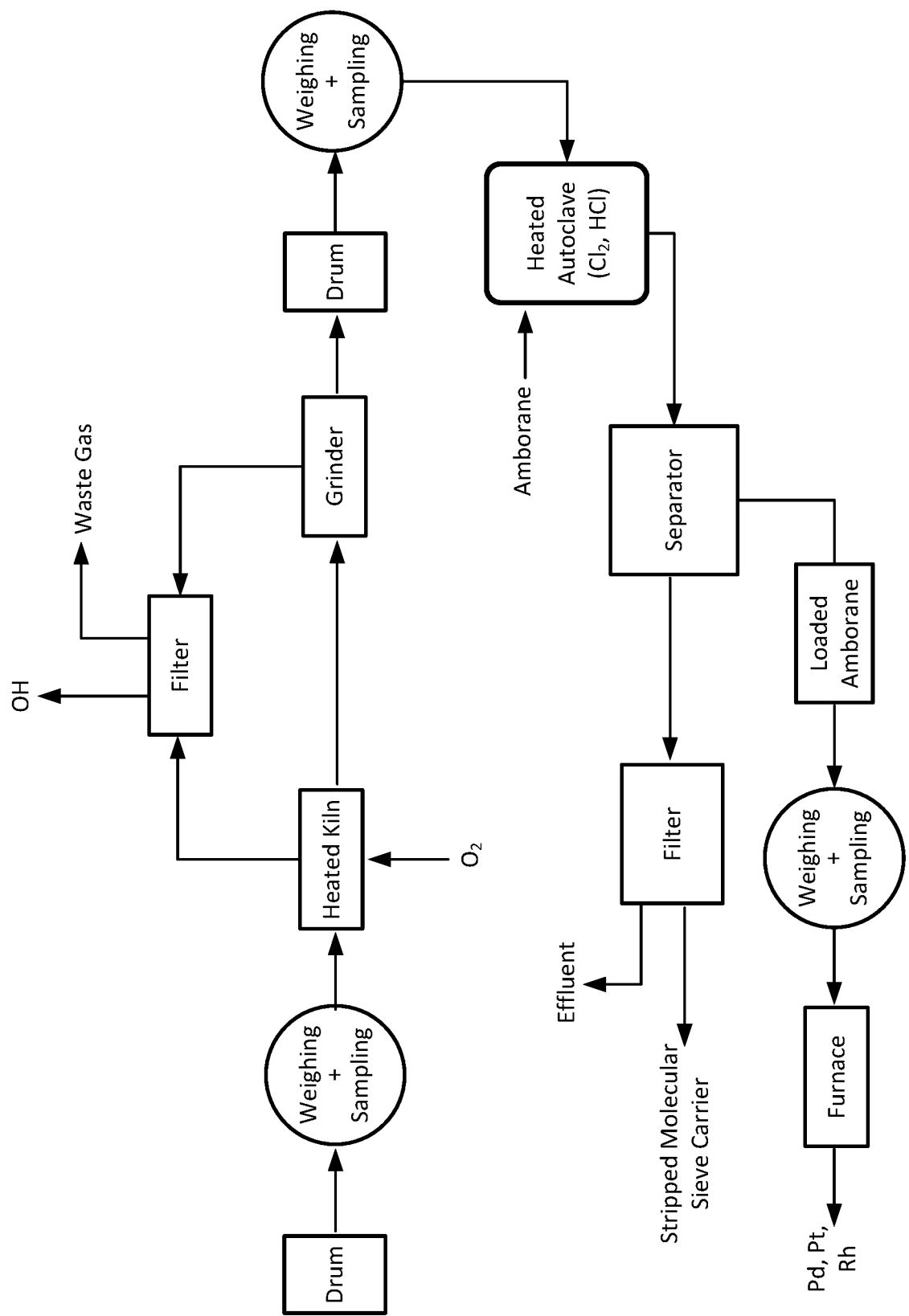

PROCESS FOR RECOVERING PRECIOUS METALS FROM MOLECULAR SIEVE BODIES

FIELD OF THE INVENTION

The present invention relates to the process for recovering precious metals, such as the platinum group metals, which are contained either in ionic or elemental form by crystalline aluminosilicate molecular sieves while substantially retaining the crystal structure of the molecular sieve support. More particularly it relates to the process for recovering precious metals from spent molecular sieve supports by non-destructive extraction and ion exchange of the support material with an aqueous medium containing base metal ions to produce an aqueous medium containing both base metal and precious metal ions, and thereafter using a solid nonionic crosslinked resin containing amine or phosphine borane adducts. The process provides a means to recover a high percentage of the precious metal while preserving the characteristic adsorption or catalytic properties of the molecular sieve support, thereby enabling it to be reused in other applications.

BACKGROUND OF THE INVENTION

The use of crystalline aluminosilicate molecular sieves as supports for precious metals in catalytic process applications is now, and has been for the past thirty or so years, well known in the art.

A significant proportion of the world's supply of platinum group metals (PGM) is currently utilized as the hydrogenation constituent of zeolite based hydrocarbon conversion catalysts in the petroleum refining industry. The antipollution catalytic converters which are now essential parts of automotive exhaust systems also utilize, cumulatively, very large amounts of precious metals. Precious metal loaded molecular sieve bodies are not, moreover, limited to the field of catalysis. For example, silver and gold, either in ionic or finely divided elemental form, when imparted to zeolite adsorbents have been found to greatly enhance the adsorptive capacity of zeolitic adsorbents for mercury and mercury compounds and accordingly are used extensively in the natural gas industry to remove this toxic contaminant from wellhead natural gas streams. In view of the very considerable cost of the precious metals involved, it is frequently an economic imperative to recover as high a proportion of these metals as is reasonably possible when the catalyst or adsorbent composition containing same are no longer suitable or required for their originally intended function.

In general, the precious metal is contained by the molecular sieve in the internal cavities of the crystal structure and can exist as extremely fine elemental particles, as zeolitic cations balancing the net negative charge on the $A10^-$ tetrahedral units, or chemically combined in non-zeolitic molecular species such as salts or oxides, or mixtures of these various forms depending in large part upon the method of preparation of the particular metal-loaded composition involved and the particular process in which the composition has previously been employed. Regardless of the exact chemical form in which they exist in the molecular sieve, the precious metal constitutes only a small fraction of the molecular sieve composite. Moreover, to recover this small quantity of metal while maintaining the microporous crystal structure of the molecular sieve, the precious metal moieties must be caused to pass to the external surface of the composite through the tortuous path created by the crystal structure and any binder material which may be present. Ordinarily this would require numerous washings of the composite with water at neutral or slightly acidic pH conditions in order that the crystal structure was not unduly degraded' Such procedures would produce large quantities of aqueous solutions containing very low concentrations of precious metal valuer, thereby presenting further difficulties in the ultimate isolation of the precious metals.

Accordingly, it has been the nearly universal practice in the art to employ precious metal recovery procedures in which the crystalline molecular sieve support is totally destroyed. With respect to support materials generally, there are four basis procedures, namely (1) dissolving the support, (2) dissolving the precious metal in a strong acid, (3) volatization of the precious metal, and (4) volatization of the support.

Combinations of the techniques are sometimes employed. With respect to alumina-containing molecular sieve supports, the process conditions necessary for each of these procedures result in severe or total destruction of the molecular sieve. See R. P. Mehrota, Chem. Ind. Dev. 8 pp. 26-31 (1974) in this regard.

In the event a procedure were available wherein the precious metal would be recovered from crystaline molecular sieve supports while maintaining the essential adsorption/catalytic properties of the support material for further use, a considerable portion of the expense of precious metal recovery could be offset to considerable economic advantage. Providing such a procedure is the purpose of the present invention.

In addition, when the precious metal is recovered by the present conventional technique of smelting the material at high temperature there exists a tremendous time-lag between the removal of the catalyst from the reactor and the time the precious metal is recovered at the smelter. It will take typically nine (9) months to complete the recovery. If a fresh catalyst charge is to be made during this time the owner of the catalyst must either carry a spare charge of metal or must lease the metal from someone else. The cost of this delayed return is huge, typically amounting to about $5 per troy ounce of metal per month. For a typical reactor charge of 200,000 pounds of hydrocracking catalyst this cost would be $720,000.

SUMMARY OF THE INVENTION

It has now been discovered that crystalline aluminosilicate-based molecular sieves containing precious metals in ionic form can be treated to recover the precious metal without destruction of the molecular sieve. The treatment comprises contacting said molecular sieve under ion-exchange conditions with an aqueous solution of at least one metal cation substantially unreactive with a nonionic borane reducing resin, said resin comprising a solid cross linked copolymer containing a plurality of amine- or phosphine-borane adducts, to produce an aqueous solution containing precious metal cations, recovering the crystalline molecular sieve and contacting said solution with said nonionic borane reducing resin at a temperature of from about 20° C. to about 35° C., preferably 20° C. to 30° C., and at a pH of greater than 1.0 but less than about 8.0, preferably 2.0 to 4.0, to reduce and sequester the precious metal cations as elemental values within said resin, and recovering the precious metal from said resin.

BRIEF DESCRIPTION OF THE DRAWINGS

The FIGURE is a schematic illustrating the recovery of a platinum group metal having an atomic number greater than 44 from a spent catalyst.

DETAILED DESCRIPTION OF THE INVENTION

The process of the present invention takes advantage of the unique selectivity for reducing precious metal ions which is possessed by a particular class of nonionic borane reducing resins. These compositions are known in the art to be useful as reducing agents for certain metal ions, aldehydes, ketones, alkenes and the like.

Particularly preferred for use in this invention are the resins characterized and the method for their preparation described in U.S. Pat. No. 4,223,173 issued Sep. 16, 1980 to L. Manziek, the disclosure of which is incorporated by reference herein in its entirety. In general, these nonionic cross-linked reins have the general formula

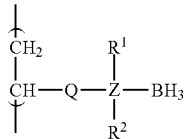

wherein "Q" represents a group having the formula

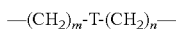

and wherein "m" and "n" are severally integers from 0 to 3, and "T" represents the groups

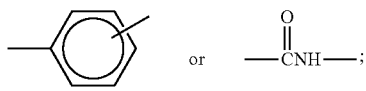

wherein $R^1$ and $R^2$ are each independently (a) hydrogen, (b) ($C_1$-$C_8$) optionally substituted alkyl groups, (c) ($C_6$-$C_8$) optionally substituted aryl groups, (d) ($C_7$-$C_{12}$) optionally substituted aralkyl groups; and "Z" is phosphorus or nitrogen.

The preferred nonionic borane resins of this invention are those wherein "T" in the general formula above is the group

wherein "Z" is nitrogen, and $R^1$ and $R^2$ are severally hydrogen, unsubstituted alkyl groups having from 1 to 4 carbon atoms, or unsubstituted aryl groups, particularly phenyl.

In general, the borane reducing resins are prepared by protonating a cross-linked resin having functional groups

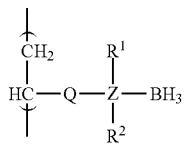

as defined hereinabove, using a strong mineral acid such as hydrochloric, phosphoric or sulfuric. Preferably, hydrochloric acid is used in at least a stoichiometric quantity with respect to the weak base moieties of the resin, i.e.,

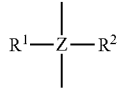

of the starting resin. The protonated reaction product is then reacted with a borohydride salt such as sodium-, lithium- or potassium borohydride dissolved in an appropriate organic solvent such as methanol or ethanol. The temperature conditions of the two reactions are not narrowly critical, but are preferably and advantageously at or near ambient room temperature. Details of the preparations are set forth in the aforesaid U.S. Pat. No. 4,223,173.

The precious metal-containing crystalline aluminosilicate molecular sieves suitably treated in accordance with the present invention include the well-known zeolitic molecular sieves and the PO-4 containing aluminosilicates, i.e., the so called SAPO class of molecular sieves, both types exhibiting significant ion-exchange capabilities. The zeolitic molecular sieves comprise a group of several hundred known naturally occurring and synthetically produced species which range in $Si/Al_2$ molar ratios from 2.0 up to several hundred. At the lower end of this scale are the widely used zeolite A, zeolite X and zeolite Y of the synthetic species, and clinoptilolite, chabazite and erionite of the naturally occurring minerals. At the high end are the synthetic zeolites prepared using organic templating agents. These include ZSM-5, ZSM-20, ZSM-34, ZSM-38 and zeolite beta as well as the silicon-substituted or alumina-extracted forms of lower Si/Al zeolites such as LZ—IO (steam and acid extracted zeolite Y), LZ-210 (Si-substituted zeolite Y) and LZ-211 (Si-substituted mordenite). Typical of zeolitic molecular sieves suitably treated by the process of this invention are those reviewed by E. M. Flanigen in Pure and Applied Chemistry, Vol. 52, pp. 2191-2211 (1980). Another comprehensive review of natural and synthetic zeolites appears in "Zeolite Molecular Sieves", D. W. Breck, published by Wiley-Interscience, New York 1974.

The SAPO molecular sieves comprise the class of silicoaluminophosphate compositions described in U.S. Pat. No. 4,440,871 and the numerous subclasses thereof in which the crystal structure of the compositions contain one or more other tetrahedra 11 y and/or octahedrally coordinated metal oxide units of metals such as iron, magnesium, cobalt, zinc, chromium, gallium, germanium, manganese and titanium. These compositions are well known in the art and have been discussed in detail in many patent and literature references. The use of precious metal-loaded SAPO or SAPO-based molecular sieve catalysts in hydrocarbon conversion reactions such as reforming and dehydrocyclization are disclosed in U.S. P. 4,741,820 and U.S. P. 4,499,315. As adsorbent bodies of the type produced by the precious metal recovery process of this invention, these molecular sieves are found to be useful, for example, in the purification of organic feeds tocks as disclosed in U.S. Pat. No. 4,899,016.

In the precious metal recovery procedure, the metal-loaded molecular sieve is first contacted with an aqueous solution containing metal cations, or complexes of said cations, substantially unreactive with a nonionic borne resin as determined by the following procedure: A small sample of the resin, ordinarily about 0.1 gram, is placed in a vial to which a concentrated solution preferably aqueous, of the metal ion or complex in question is added. The vial is then sealed and permitted to stand for an extended period of time, typically about 3 weeks, to ensure adequate contact between the solution and the resin.

A substantial reaction is determined by any appropriate analytical means which can include visual observation, i.e., to detect a change in color of the resin, gravimetric analysis to detect an increase in weight of the resin, or contact, of the resin with a solution of a metal ion or complex, such as $AuCl_4^-$, known to be reactive with the resin and determining the capability of the resin to further react with such a reagent.

Metal ions known to be substantially unreactive toward the borane resin used herein are $Na+$, $Li^+$, $K^+$. $Mg^{+2}$, $Ca^{+2}$, $Cr^{+3}$, $Cr^{+6}$, $UO_2^+$, $Mn^{+2}$, $Fe^{+3}$, $Co^{+2}$, $Ni^{+2}$, $Cu^{+2}$, $Zn^{+2}$, $Cd^{+2}$, $Sr^{+2}$, $Pb^{+2}$, $Tl^+$, and $Pb^{+4}$, It is particularly preferred that the solution initially contacting the precious metal-loaded molecular sieve contain at least $Na^+$ or $K^+$ cations because of the favorable ion-exchange properties these ions exhibit with respect to molecular sieves in general.

The concentration of these non-reactive cations in the contacting solution and the proportions of molecular sieve and solution are not critical, but at least stiochiometric quantities of the base metal ions are advantageously present.

Very low concentrations contribute to the effectiveness of removal of the precious metal cations from the starting molecular sieve. Depending upon the precise chemical composition of the starting molecular sieve, the base metal cations can be derived in whole or in part from the molecular sieve itself.

The solution of base metal cations can also contain non-metallic cations, particularly $H^+$ or $NH_4^+$, which facilitate the extraction of precious metal values from the molecular sieve, but such non-metal cations should not be present in sufficient concentrations to cause significant destruction of the crystal structure of the molecular sieve, i.e., ion-exchange conditions should be maintained.

It will be understood by those skilled in the art that the stability of the crystal structure of the various molecular sieves toward the treatment with ion-exchange solutions varies greatly among the various species.

Optimum reaction conditions can readily and routinely be determined, however, by even those relatively unskilled in the zeolite art.

It will be further understood that as used herein the term "ion-exchange conditions" concerns not only the exchange of zeolitic cations but also the exchange of precious metal cations present in the molecular sieve internal cavities in the form of non-zeolitic molecular complexes, salts, and the like.

As used herein, the term "precious metal" refers to silver and gold and to the platinum group metals having an atomic number of greater than 44 and which are selectively reduced by the borane resin employed in the present process, namely Rh, Pd, Os, Ir and Pt.

The contact of the ion-exchange solution with the starting molecular sieve composite is maintained for a period of time sufficient to produce a solution containing the desired precious metal values in ionic form. Thereafter this solution, before or after isolation from the molecular sieve, is contacted with the nonionic borane reducing resin whereby the precious metal ions are reduced to elemental metal and sequestered by the resin.

Ordinarily, the molecular sieve is removed from the solution prior to contact by the borane resin, thereby avoiding the necessity for separating the two solid phases before recovery of the precious metal from the resin is carried out.

Moreover, while the resin is hydrolytically stable at very low pH conditions, i.e., pH=1 or even lower, the molecular sieve can be unstable at such conditions and must, therefore, be isolated from the system when necessary to preserve its structural integrity.

On the other hand, the borane resin is found to be much more effective in precious metal ion reduction at pH conditions in the range of 6 to 8, particularly pH=7, than at lower pH conditions. Under these conditions it is not absolutely essential to isolate the molecular sieve from the system, but the resin particles must be separated from the molecular sieve crystals before recovery of the elemental precious metal from the resin is carried out.

The hydrolytic stability, and hence the reducing capacity, of the resin is also significantly affected by the temperature of the solution being treated. Ambient room temperatures of from about 20° C. to 30° C. are much preferred in the precious metal reduction stage. A temperature of about 23° C. to 25° C. is especially preferred.

Isolation of the sequestered precious metal from the borane resin can readily be accomplished by calcination at elevated temperatures sufficient to thermally destroy the resin. Calcination temperatures of 500° C. to 800° C. are suitably employed. In the reduction of the precious metal ions, the $BH_3$ adduct of the resin is converted to boric acid and removed from the resin by solution in the treated solution. $BH_3$ moieties remaining on the resin can result in the production of borate glass during calcination, an occurrence which is advantageously avoided by removing any remaining $BH_3$ functionality via reduction with and aldehyde or a ketone, for example.

The invention is illustrated with reference the following example.

Example 1

(a) An acrylic-based amine-borane reducing resin is prepared in accordance with the teachings of U.S. Pat. No. 4,311,812, the disclosure of which is incorporated by reference herein in its entirety. A 50 gram sample of an acrylic based macroreticular weak base resin having a weak base capacity of 5.4 meg. of weak base per gram of dry resin is stirred for 5 hours with an aqueous hydrochloric acid solution containing 360 meg. of HCL. The resin is washed with deionized water to a neutral pH, then with two 300 ml portions of acetone and then vacuum dried at 50° C. for 8 hours. A 52.8 gram portion of the dried resin is added to a 500 ml round bottom flask equipped with a sealed mechanical stirrer, pressure compensating dropping funnel and mineral oil bubbler. A solution of 10 grams sodium borohydride in 250 ml. of dry N, N-dimethylformamide is added rapidly with continuous stirring at room temperature until no further hydrogen is evolved. The N, N-dimethylformamide is removed by filtration and the remaining resin is backwashed with deionized water until the wash water is chloride free. The resin is vacuum dried at 30° C.

(b) A spent palladium-loaded catalytic mass used in the hydrocracking of a mineral oil feedstock is treated initially under ion-exchange conditions to extract the palladium values by contact at 25° C. with an aqueous solution containing sodium and magnesium cations and having a pH of about 7. The catalyst was initially prepared by ion-exchanging a sodium zeolite Y having a $Si/Al_2$ molar ratio of 4.8 to reduce the $Na_2O$ content to about 1 weight percent. The zeolite was then back-exchanged with magnesium cations to the extent that its MgO content was about 3 weight percent. This product was slurried with water containing 20 weight percent alumina gel and sufficient palladium tetramminochloride to introduce 0.5 weight percent palladium into the final product. The wet filter cake from the filtered slurry was dried and calcined at 930° F. over a five hour period. The crystallinity of the zeolite catalyst support, originally at about 90 percent as a consequence of the hydrothermal abuse incurred during use in the hydrocracking process, is only slightly further reduced to about 85 percent as a consequence of the ion-exchange palladium removal step. Thereafter the zeolite is recovered by filtration and the palladium-containing medium passed through a fixed bed of the borane resin particles of part (a) hereof at a temperature of 25 degrees Celsius and a pH of 7.0. The pure palladium metal reduced and sequestered on the borane resin is recovered by destructive calcination of the resin at 750 degrees Centigrade.

The Overall Processes for Recovery of Precious Metal from Spent Molecular Sieve Catalyst.

This invention describes the recovery of either palladium or platinum from spent Molecular Sieve Catalyst (MSC) which is carried out hydrometallurgically. The spent MSC is first stripped of all Coke deposits through burn-off in a reactor at a temperature of 800 to 900 degrees Celsius. The pellets are then ground to a mesh size of 10 to 50 microns whereupon the powdered material is fed into an acid solution (such as a solution comprising hydrochloric acid and chlorine), at a temperature of 80 to 100 degrees Celsius. After initial dissolution of the precious metal the solution is brought into contact with Amborane® resin pellets in such a proportion that 1 kg of resin will absorb approximately 0.75 kg of precious metal. Thus 100 kg of MSC containing 0.5% PD or PT metal will be brought into contact with 0.67 kg of Amborane® resin.

After a contact time of 15 minutes the mixture of MSC and Resin is removed from the reactor. The larger particle Resin is separated from the mixture by simple screen separation, is washed and then air dried. After drying is complete, the Resin is incinerated in an oven at 750 degrees centigrade. After the incineration is complete the Platinum or Palladium metal is then removed from the furnace as a granular powder.

The MSC plus acid solution is then filtered to remove the undissolved Molecular Sieve carrier, now free of precious metal. After washing and drying of the residual Molecular sieve, this de-aluminated Molecular Sieve is available for further use as a fresh catalyst material.

What is claimed is:

1. A process for recovering both precious metal loaded in a crystalline aluminosilicate-based molecular sieve and the molecular sieve itself, the process comprising:
providing a crystalline aluminosilicate molecular sieve composite containing a crystalline aluminosilicate molecular sieve loaded with precious metals;
contacting the crystalline aluminosilicate molecular sieve composite with an aqueous ion-exchange solution to produce the crystalline aluminosilicate molecular sieve and an aqueous new solution containing base metal cations and precious metal cations, the base metal cations selected from the group consisting of Na+, Li+, $K^+$, $Mg^{+2}$, $Ca^{+2}$, $Cr^{+3}$, $Cr^{+6}$, $UO_2^+$, $Mn^{+2}$, $Fe^{+3}$, $Co^{+2}$, $Ni^{+2}$, $Cu^{+2}$, $Zn^{+2}$, $Cd^{+2}$, $Sp^{+2}$, $Pb^{+2}$, $Tl^+$, and $Pb^{+4}$;
reducing the precious metal cations within a nonionic borane reducing resin by contacting the aqueous new solution with the resin at a temperature of from 20° C. to 35° C. and at a pH of greater than 1 but less than 8, the resin comprising a solid cross-linked copolymer containing a plurality of amine-borane adducts or phosphine-borane adducts, thereby producing a mixture of the crystalline aluminosilicate molecular sieve and resin containing precious metals, and a remaining solution containing the base metal cations;
separating the resin from the mixture;
recovering the precious metals from the resin;
recovering the crystalline aluminosilicate molecular sieve by passing the remaining solution through a filter that separates the crystalline aluminosilicate molecular sieve therefrom.

2. The process according to claim 1, wherein the ion-exchange solution comprises hydrochloric acid.

3. The process according to claim 1, wherein separating the resin from the mixture comprises passing the mixture through a screen.

4. The process according to claim 1, wherein recovering the precious metals from the resin comprises incinerating the resin.

5. The process according to claim 1, wherein the crystalline aluminosilicate molecular sieve composite comprises a crystalline aluminosilicate zeolite molecular sieve.

6. The process according to claim 1, wherein the crystalline aluminosilicate molecular sieve composite comprises a crystalline silicoaluminophosphate molecular sieve.

7. The process according to claim 1, wherein at least some of the base metal cations are derived from the crystalline aluminosilicate molecular sieve composite.

8. The process according to claim 1, wherein recovering the precious metal cations from the resin comprises recovering a platinum group metal having an atomic number greater than 44.

9. The process according to claim 1, wherein the amine-borane adducts or phosphine-borane adducts are of the formula:

$$\begin{array}{c} \overset{|}{CH_2} \\ | \\ HC-Q-\underset{|}{\overset{R^1}{Z}}-BH_3 \\ | \\ R^2 \end{array}$$

wherein "Q" represents a group having the formula $-(CH_2)_m\text{-}T\text{-}(CH_2)_n-$ wherein "m" and "n" are each independently integers from 0 to 3, and "T" represents the groups

[phenylene] or $-\overset{O}{\underset{\|}{C}}NH-$ ;

and wherein $R^1$ and $R^2$ are each independently
(a) hydrogen,
(b) ($C_1$-$C_8$) optionally substituted alkyl groups,
(c) ($C_6$-$C_8$) optional LY substituted aryl groups, or
(d) ($C_7$-$C_{12}$) optionally substituted aralkyl groups;
and "Z" is phosphorus or nitrogen.

10. The process according to claim 1, wherein the temperature is from 20° C. to 30° C.

11. The process according to claim 1, wherein the pH is between 2 and 4.

12. The process according to claim 1, wherein the base metal cations in the aqueous new solution are derived in whole from the crystalline aluminosilicate molecular sieve.

13. The process according to claim 1, wherein the base metal cations in the aqueous new solution are derived in part from the crystalline aluminosilicate molecular sieve.

14. The process according to claim 2, wherein the ion-exchange solution further comprises chlorine.

* * * * *